United States Patent

[11] 3,625,292

| [72] | Inventor | Michael T. Lay |
| | | West Chicago, Ill. |
| [21] | Appl. No. | 842,602 |
| [22] | Filed | July 17, 1969 |
| [45] | Patented | Dec. 7, 1971 |
| [73] | Assignee | G. W. Murphy Industries, Inc. |

[54] POWER CUTTING TOOL HAVING INSULATED SLIP CLUTCH
7 Claims, 4 Drawing Figs.

[52] U.S. Cl..................................... 172/13,
172/15, 64/30, 81/52.4, 56/256
[51] Int. Cl..................................... A01b 45/00,
F16d 7/02
[50] Field of Search........................ 172/13, 14,
15, 16, 17, 18, 35, 41, 92, 528, 533, 103; 56/25.4;
64/30; 81/52.4

[56] References Cited
UNITED STATES PATENTS

| 1,505,480 | 8/1924 | Manville...................... | 64/30 |
| 1,522,492 | 1/1925 | Boykin ........................ | 81/52.4 |
| 2,525,379 | 10/1950 | Smilansky .................... | 64/30 |
| 2,595,818 | 5/1952 | Smila........................... | 64/30 |
| 2,672,002 | 3/1954 | Nelson ........................ | 172/15 |
| 2,823,597 | 2/1958 | Kelsey.......................... | 172/103 |
| 2,827,748 | 3/1958 | Simpson....................... | 172/16 |
| 2,888,993 | 6/1959 | Dunning....................... | 172/103 |
| 3,086,596 | 4/1963 | Allegretti et al............. | 172/15 |
| 3,485,018 | 12/1969 | Beckering et al............ | 56/25.4 |
| 3,488,980 | 1/1970 | Burrough .................... | 64/30 |
| 3,500,620 | 3/1970 | Duran et al.................. | 56/25.4 |

*Primary Examiner*—Robert E. Pulfrey
*Assistant Examiner*—C. W. Hanor
*Attorney*—Hofgren, Wegner, Allen, Stellman & McCord ABSTRACT: A lawn edger and trimmer or the like having a shaft driven by an electric motor mounted in a casing and supplied with electricity by a power cord. The cutting blade is mounted on the shaft by a slip clutch which also electrically insulates the blade from the shaft to prevent shock to the operator in the event of electrical malfunction of the motor or in the event the blade accidentally cuts the power cord or other source of electrical supply. The slip clutch includes an electrically insulative mass on which the blade is mounted and in which is provided an enclosed internal cavity receiving the end of the shaft. An appropriate resilient means such as a series of Bellville washer springs are mounted on the shaft and bias between an enlarged end of the shaft, e.g., a retaining and tightening nut, and a portion of the cavity wall to cause driving of the insulating mass and blade by the shaft. When an obstruction such as a rock or other hard object is struck by the blade, the spring bias of the resilient means is overcome and the shaft can continue to rotate without driving the blade. The bias of the clutch can be adjusted by means of the tightening nut.

PATENTED DEC 7 1971 3,625,292

INVENTOR
Michael T. Lay
BY Hofgren, Wegner, Allen, Stellman & McCord
ATTORNEYS

PATENTED DEC 7 1971

3,625,292

3,625,292

POWER CUTTING TOOL HAVING INSULATED SLIP CLUTCH

BACKGROUND OF THE INVENTION

1. Field of the Invention

This invention relates to an electrically insulating slip clutch for an electrically powered cutting tool. More particularly the invention relates to a lawn edging and trimming device in which the slip clutch action protects against damage to the gears or motor or breakage of the blade and the insulation protects against shock to the operator in the event of electrical malfunction of the motor or in the event the power cord or other electrical supply source is cut by the blade.

2. Description of the Prior Art

Slip clutches have been known and used in all kinds of devices wherein it is necessary to protect the gears or motors from physical damage. The slip clutches used in edger trimmers have been complicated and generally ineffective. But one of the chief drawbacks is the fact that they present a direct metal-to-metal conductive path to the motor and to the operator wherein malfunctions of the motor or cutting or contact of the blade with an electrical source can cause serious injury or damage.

SUMMARY OF THE INVENTION

The present invention provides a lawn edger and trimmer having an electrically insulating slip clutch for insulating the cutting blade from the drive shaft. The device includes an electric motor which drives the shaft on which an electrically insulative member is mounted by compression spring means, biasing between the shaft and insulating member for driving the insulating member from the shaft. The cutting blade is secured to the insulating member.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

DESCRIPTION OF THE PREFERRED EMBODIMENTS

Figure 1:
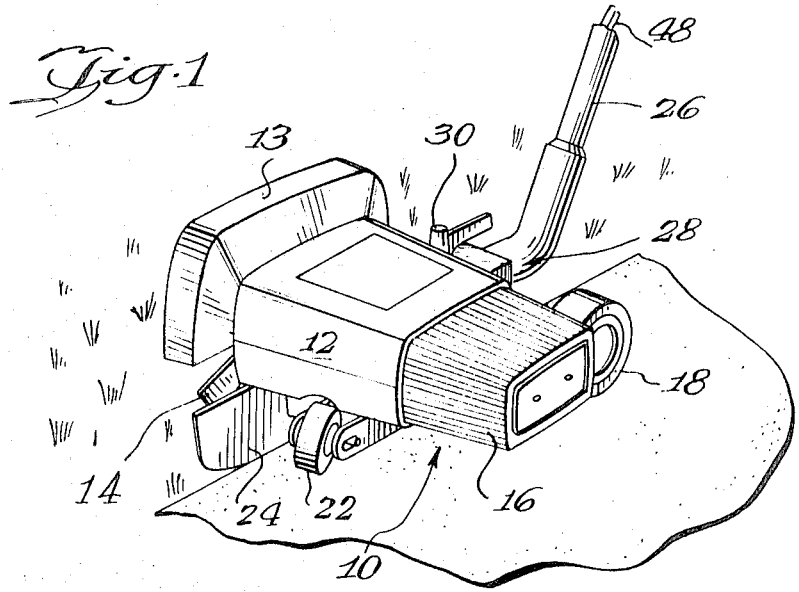
FIG. 1 is a perspective view of a lawn edging and trimming device embodying a form of the present invention.

Turning first to FIG. 1, an embodiment of the edger and trimmer of this invention is shown generally at 10. Edger-trimmer 10 has a plastic casing 12 including a blade guard portion 13 for guarding a metal cutting blade 14 and a vented portion 16 containing an electric motor. Plastic casing 12 is supported on two rear wheels 18 and 20 (FIGS. 2 and 4) and a front wheel 22 which is preferably turned at an angle away from the blade during forward travel of the device in the manner described in my copending application Ser. No. 842,597 filed July 17, 1969. A metal guide plate 24 is mounted on the plastic casing 12 for guiding along the edge of a sidewalk during lawn-edging operation. During trimming operation, plate 24 protects against objects which may be thrown by blade 14. A preferred manner of mounting guide plate 24 on casing 12 is shown in my copending application Ser. No. 842,596 filed July 17, 1969.

A tubular metal handle 26 is connected to casing 12 through a pivotal connection as at 28 which is provided with a locking mechanism 30. Pivotal connection 28 permits pivoting of the casing and blade between positions 90° apart for reorienting the casing and blade between edger and trimmer operating positions. The locking mechanism 30 secures the casing and blade in either position relative to the handle. A preferred pivotal connection and locking system is described in my copending application Ser. No. 842,598 filed July 17, 1969 and now U.S. Pat. No. 3,561,199.

Figure 2:
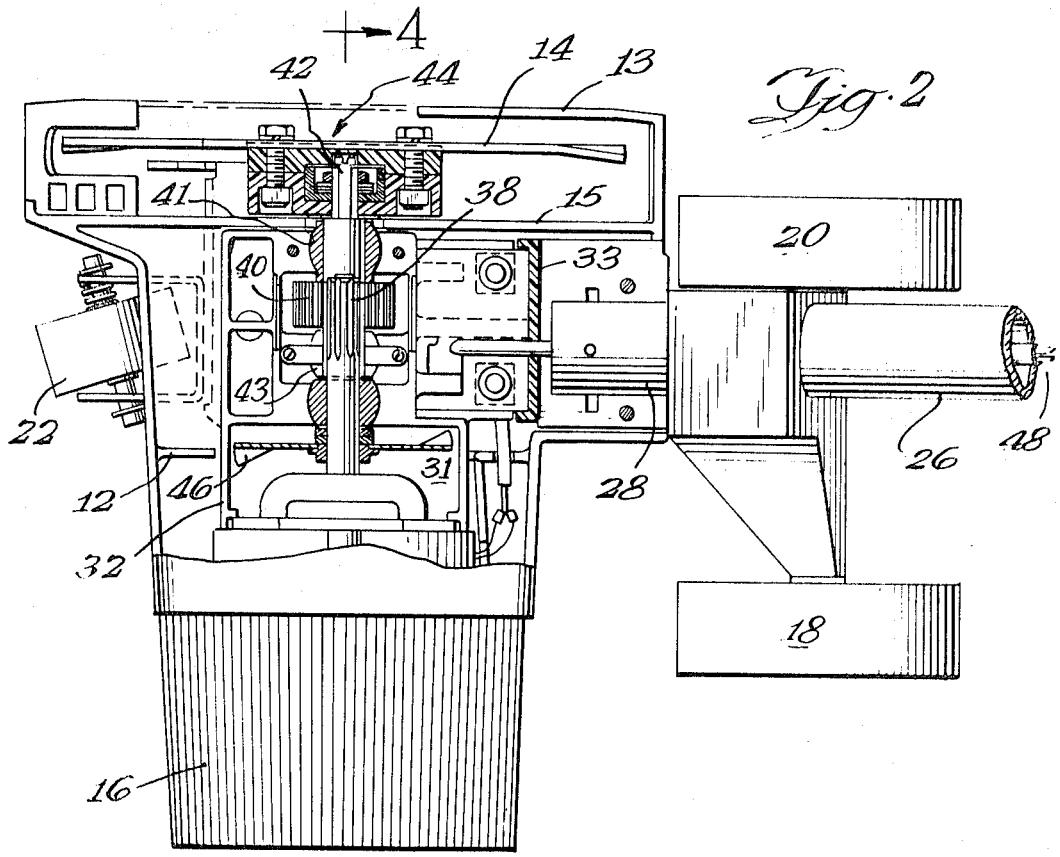
FIG. 2 is an enlarged fragmentary section through the device of FIG. 1 along line 2—2 of FIG. 4.
Figure 3:
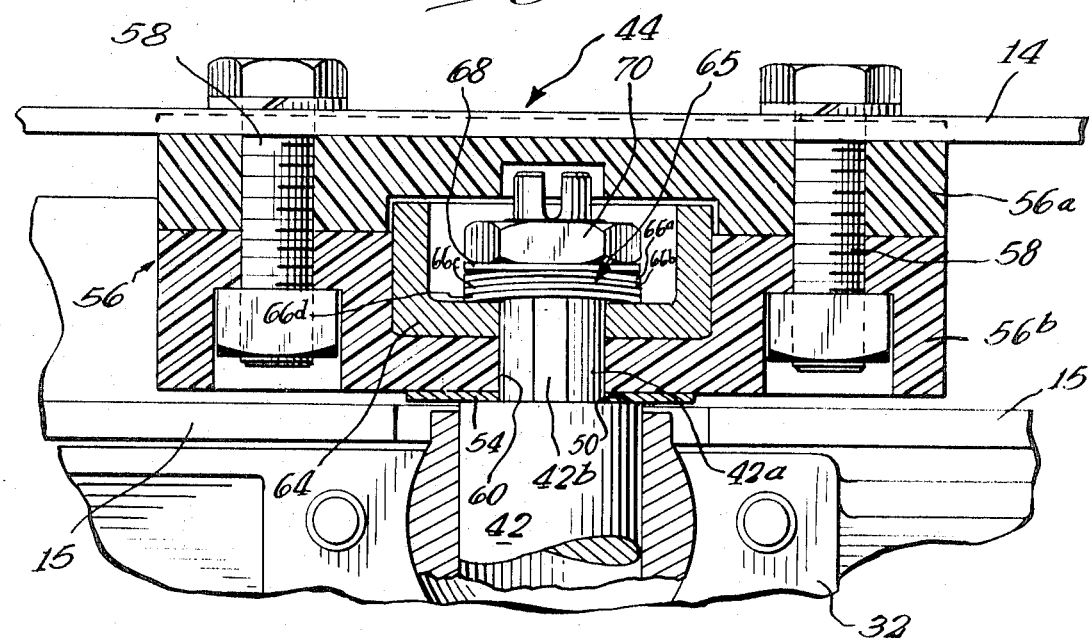
FIG. 3 is an enlarged section through the insulating slip clutch in the device of FIGS. 1 and 2.
Figure 4:
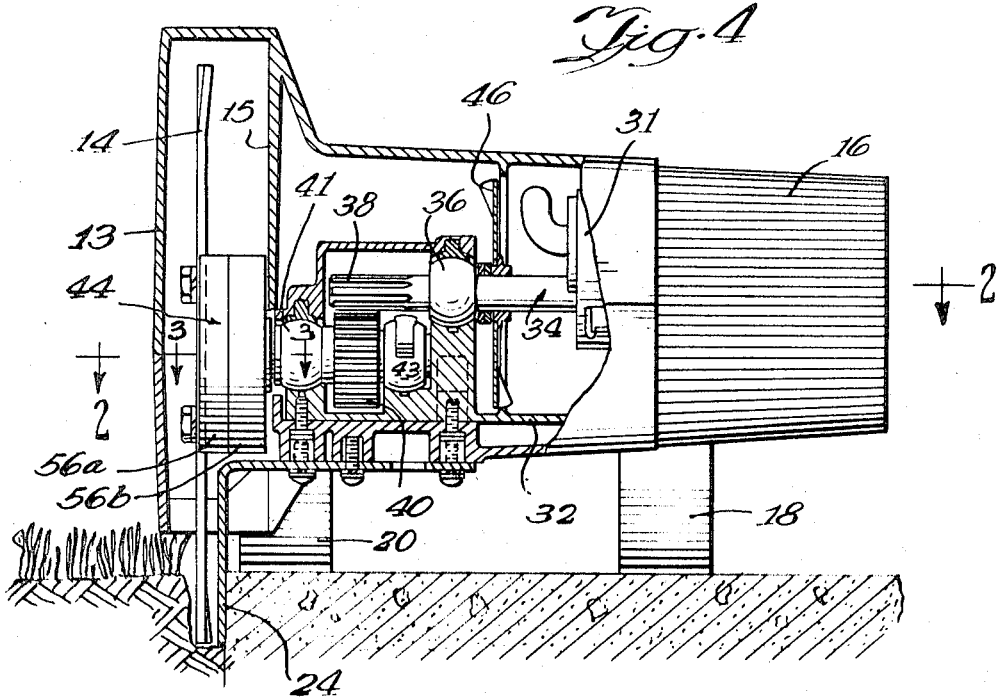
FIG. 4 is a fragmentary section through the device along the line 4—4 of FIG. 2.

The electric motor 31 is mounted on an aluminum motor and drive train mounting frame 32 (FIGS. 2–4). The motor drive shaft 34 is mounted by a suitable bearing 36 mounted in frame 32 and shaft 34 has a toothed or gear end 38. Shaft end 38 is in mesh with a gear 40 on shaft 42 which is mounted by suitable bearings 41 and 43 for driving blade 14 through an electrically insulating slip clutch 44.

A fan blade 46 may be mounted on shaft 34 for drawing air in through vented housing portion 16 for cooling the motor and other internal parts. The isolated electric cord 48 for supplying electrical energy for motor 31 is contained within handle 26 and extends from handle 26 at the upper end thereof in a normal manner for plugging into a suitable electric outlet.

In operation of the device thus far shown, the motor is turned on by a suitable switch (not shown) adjacent the upper end of handle 26 and, in the position shown in FIGS. 1, 2 and 4, the device is used for edging sidewalks and the like. Plate 24 guides along an edge of the sidewalk in the manner shown in FIG. 1 while blade 14 rotates to dig and cut adjacent plate 24 to produce a neatly edged lawn along the sidewalk. The device can be converted to a trimmer for trimming around trees, shrubs, and the like, by loosening locking mechanism 30 and rotating casing 12 and blade 14 counterclockwise 90° relative to handle 26 as viewed in FIG. 1 and retightening locking mechanism 30. Rear wheels 18 and 20 are part of a carriage secured to handle 26 and which is stationary with handle 26. When operating as an edger, the angularly disposed front wheel 22 advantageously helps keep guide plate 24 against the edge of the sidewalk. When operating as a trimmer, front wheel 22, which is mounted on the front of the casing 12, is rendered inoperative since it has been moved 90° relative to wheels 18 and 20 with casing 12 and does not engage the ground.

A plurality of provisions are included to protect the operator against shock due to spark jump from the motor in the event of an electrical malfunction in the motor or in the event of an accidental cutting of the electric supply cord 48 or any other electrical supply conductor by blade 14. The insulated clutch 44 blocks transmission of electricity from blade 14 to the remainder of the device. Should the cut cord engage guide plate 24, transmission of electricity to the device is blocked by plastic casing 12 and an air gap provided between plate 24 and casing 12 at the mounting position of casing 12. Further, insulating member 33 provided between the metal handle 26 and the motor and gear train mounting frame 32 blocks electrical conduction from frame 32 and spark jump from motor 31 from reaching the metal handle 26.

Returning to the insulated slip clutch 44 for consideration in more detail, reference is made to FIG. 3. The shaft 42 has a reduced end 42a which has one flat side 42b both of which form a shoulder 50. Between the reduced end 42a and shoulder 50 is a washer 54 with a D-shaped opening which fits the flat side 42b so that the washer 54 rotates with the shaft. A drum shaped casing 56 of electrically insulating material is provided for containing the operating elements of clutch 44. Casing 56, as shown in FIG. 3, comprises a pair of facing shallow insulating cups 56a and 56b which are secured together and are secured to blade 14 by bolts 58. Casing 56 is slip-fitted and rotational at 60 on reduced shaft end 42a so that shaft 42 is independently rotatable relative to casing 56 and blade 14.

The dish or cuplike configurations of insulating cups 56a and 56b provide a cavity 62 for containing the reduced end portion 42a of the shaft 42. A metal, cup-shaped, wear resistant thick liner member 64 having a D-shaped hole lines the interior of cavity 62 along the cylindrical side wall surface and the flat surface of the entry wall for shaft end 42a. Liner member 64 is slip-fitted over reduced end 42a with the D- shaped hole coacting with the flat on end portion 42a for rotation with the shaft 42. An axially loaded biasing member 65 is slip-fitted over reduced portion 42a and bears against liner member 64. Although any biasing member 65 could be used, in the illustrated form, a series of Bellville washer springs 66a through 66d are slip-fitted on the end 42a of the shaft and bear against the liner member 64. A washer 68 with a D-shaped hole is received on reduced end 42a against the Bellville springs 66a and a retaining nut 70 is threaded on a threaded end of reduced portion 42a to compress Bellville springs 66 and urge them tightly against liner member 64 to a predetermined torque. The amount of torque is varied by turning the nut either in or out relative to the liner 64 to adjust the slip value of the clutch.

In operation of the device, the urging of the biasing means 65 between washer 68 and liner member 64 is sufficient to cause liner member 64 to bear against insulating cup 56b and washer 54 and rotate with shaft 42 under normal operating conditions. However, should blade 14 strike a hard object e.g., a buried rock, during, for instance, an edging operation, the force of the biasing means 65 is overcome and shaft 42, washer 54 and liner 64 will continue to rotate without rotation of casing 56 and blade 14 so that blade 14 will merely stop. Further, should blade 14 accidentally cut the electric line, insulating casing 56 insulates against transmission of shock or current to shaft 42. Plastic casing portion 15 provides additional electrical insulation against spark jump and also blocks possible entry of any outside foreign object including a loose cut electrical line into the motor and gear portion of the casing. Just as soon as the blade is freed up, the clutch will reengage and the shaft will be drivingly connected to the blade again.

I claim:

1. A cutting device for edging or trimming lawns which comprises a wheeled carriage, an electric motor carried on said carriage and having a driven shaft, an electrically insulating member mounted on said shaft, said insulating member having at least two opposing sides which define an enclosed cavity therebetween, a blade mounted on one side of said insulating member by fastening means spaced from said cavity and joining said opposing sides together, an enlargement adjacent the end of said shaft resulting in a reduced diameter portion at the end of the shaft with said reduced diameter portion projecting into said cavity, said reduced diameter portion of the shaft impales the other side of said insulating member and terminates in said cavity whereby said insulating member is mounted on said shaft for rotation relative thereto out of electrically conductive relationship therewith, and slip clutch means comprising axially loaded biasing means between said shaft and said insulating member for driving the insulating member and blade with the shaft, said biasing means biases between said shaft enlargement and an inside surface of the cavity wall.

2. The device of claim 1 wherein said biasing means surrounds said shaft and biases against the surface of the shaft-impaled wall.

3. The device of claim 1 including a cavity liner member between the biasing means and impaled wall surface for protecting said surface from damage by the spring.

4. A cutting device for edging or trimming lawns which comprises a wheeled carriage, an electric motor carried on said carriage and having a driven shaft, an electrically insulating member mounted on said shaft, said insulating member has opposing sides and an enclosed cavity, vertically disposed blade mounted on one side of said electrically insulated member, said shaft impales the other side of said insulating member and terminates in said cavity whereby said insulating member is mounted on said shaft for rotation relative thereto, slip clutch means comprising axially loaded biasing means between said shaft and said insulating member for driving the insulating member and blade with the shaft, an enlargement on said shaft adjacent the end thereof in said cavity and wherein said biasing means biases between the shaft enlargement and an inside surface of the cavity wall, said biasing means surrounds said shaft and biases against the surface of the shaft-impaled wall, and a cavity liner member between the biasing means and impaled wall surface for protecting said surface from damage by the spring, said cavity is cylindrical and said liner member is cup-shaped and lines the sidewall of the cavity.

5. A cutting device for edging or trimming lawns which comprises a wheeled carriage, an electric motor carried on said carriage and having a driven shaft, an electrically insulating member mounted on said shaft, said insulating member has opposing sides and an enclosed cavity, a vertically disposed blade mounted on one side of said electrically insulated member, said shaft impales the other side of said insulating member and terminates in said cavity whereby said insulating member is mounted on said shaft for rotation relative thereto, slip clutch means comprising axially loaded biasing means between said shaft and said insulating member for driving the the insulating member and blade with the shaft, and an enlargement on said shaft adjacent the end thereof in said cavity and wherein said biasing means biases between the shaft enlargement and an inside surface of the cavity wall, said biasing means comprises a spring means on said shaft.

6. A cutting device for edging or trimming lawns which comprises a wheeled carriage, an electric motor carried on said carriage and having a driven shaft, an electrically insulating member mounted on said shaft, said insulating member has opposing sides and an enclosed cavity, a vertically disposed blade mounted on one side of said electrically insulated member, said shaft impales the other side of said insulating member and terminates in said cavity whereby said insulating member is mounted on said shaft for rotation relative thereto, slip clutch means comprising axially loaded biasing means between said shaft and said insulating member for driving the insulating member and blade with the shaft, and an enlargement on said shaft adjacent the end thereof in said cavity and wherein said biasing means biases between the shaft enlargement and an inside surface of the cavity wall, said biasing means comprises a stack of disc-shaped springs on said shaft.

7. The device of claim 6 wherein a nut is received on a threaded end of the shaft to be tightened to increase compression of said springs and to be loosened to decrease compression for adjusting the slip value of the clutch.

* * * * *